United States Patent
Ogg et al.

(10) Patent No.: US 10,847,843 B2
(45) Date of Patent: Nov. 24, 2020

(54) ELECTROLYTE FOR A NICKEL-IRON BATTERY

(71) Applicant: Encell Technology, Inc., Alachua, FL (US)

(72) Inventors: Randy Gene Ogg, Newberry, FL (US); Phil Bennett, Waldo, FL (US); Alan Seidel, High Springs, FL (US); Paul Gifford, Cape Coral, FL (US)

(73) Assignee: ENCELL TECHNOLOGY, INC., Alachua, FL (US)

( * ) Notice: Subject to any disclaimer, the term of this patent is extended or adjusted under 35 U.S.C. 154(b) by 402 days.

(21) Appl. No.: 14/174,027

(22) Filed: Feb. 6, 2014

(65) Prior Publication Data
US 2014/0220432 A1 Aug. 7, 2014

Related U.S. Application Data

(60) Provisional application No. 61/927,758, filed on Jan. 15, 2014, provisional application No. 61/761,312, filed on Feb. 6, 2013.

(51) Int. Cl.
*H01M 10/26* (2006.01)
*H01M 10/30* (2006.01)

(52) U.S. Cl.
CPC ........... *H01M 10/26* (2013.01); *H01M 10/30* (2013.01)

(58) Field of Classification Search
CPC .................................................... H01M 10/30
See application file for complete search history.

(56) References Cited

U.S. PATENT DOCUMENTS

| | | | | | |
|---|---|---|---|---|---|
| 2,871,281 | A | * | 1/1959 | Miller | H01M 4/52 429/207 |
| 3,898,098 | A | * | 8/1975 | Giles | H01M 4/52 205/66 |
| 4,123,568 | A | * | 10/1978 | Kononenko | H01M 4/26 29/623.5 |
| 4,250,236 | A | * | 2/1981 | Haschka | H01M 4/248 429/207 |
| 6,558,848 | B1 | * | 5/2003 | Kobayashi | H01M 4/661 429/233 |
| 6,844,111 | B2 | | 1/2005 | Mirzoev et al. | |
| 7,816,030 | B2 | * | 10/2010 | Phillips | H01M 4/244 429/206 |
| 2011/0123850 | A1 | | 5/2011 | Duong et al. | |
| 2012/0070746 | A1 | * | 3/2012 | Mikhaylik | H01M 2/1673 429/231.95 |
| 2012/0187918 | A1 | | 7/2012 | Narayan et al. | |
| 2014/0220460 | A1 | | 8/2014 | Ogg et al. | |

FOREIGN PATENT DOCUMENTS

WO  WO 2012/012731  *  1/2012

OTHER PUBLICATIONS

Periasamy, P., B. Ramesh Babu, and S. Venkatakrishna Iyer. "Electrochemical Behaviour of Teflon-bonded Iron Oxide Electrodes in Alkaline Solutions." Journal of Power Sources 63.1 (1996): 79-85. Web.*
International Search Report for corresponding Application No. PCT/US2014/015049, dated May 27, 2014.
International Search Report for corresponding Application No. PCT/US2014/015053 dated May 30, 2014.

* cited by examiner

*Primary Examiner* — Osei K Amponsah
(74) *Attorney, Agent, or Firm* — Merchant & Gould P.C.

(57) ABSTRACT

Providing is a battery comprising an iron anode, a nickel cathode, and an electrolyte comprised of sodium hydroxide, lithium hydroxide and a soluble metal sulfide. In one embodiment the concentration of sodium hydroxide in the electrolyte ranges from 6.0 M to 7.5 M, the amount of lithium hydroxide present in the electrolyte ranges from 0.5 to 2.0 M, and the amount of metal sulfide present in the electrolyte ranges from 1-2% by weight.

15 Claims, No Drawings

ELECTROLYTE FOR A NICKEL-IRON BATTERY

CROSS REFERENCE TO RELATED APPLICATIONS

This application claims priority to U.S. Provisional Application Ser. No. 61/761,312, filed Feb. 6, 2013, and U.S. Provisional Application Ser. No. 61/927,758, filed Jan. 15, 2014, which applications are incorporated herein by reference in their entirety.

BACKGROUND OF THE INVENTION

Field of the Invention

This invention is in the technical field of energy storage devices, particularly alkaline batteries. More particularly, the present invention is in the technical field of rechargeable batteries employing an iron negative electrode in an alkaline electrolyte.

State of the Art

Iron electrodes have been used in energy storage batteries and other devices for over one hundred years. Iron electrodes are often combined with a nickel positive electrode to form a nickel-iron (Ni—Fe) battery. The Ni—Fe battery is a rechargeable battery having a nickel(III) oxy-hydroxide positive electrode and an iron negative electrode, with an alkaline electrolyte such as potassium hydroxide. The overall cell reaction can be written as:

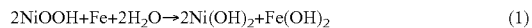

$$2NiOOH + Fe + 2H_2O \rightarrow 2Ni(OH)_2 + Fe(OH)_2 \quad (1)$$

It is a very robust battery which is tolerant of abuse (overcharge, overdischarge, and short-circuiting) and can have a very long life even if so treated. Ni—Fe batteries are often used in backup situations where it can be continuously charged and may last for more than 20 years. However, due to its low specific energy, poor charge retention, and high cost of manufacturing, other types of rechargeable batteries have displaced Ni—Fe in most applications.

The ability of these batteries to survive frequent cycling is due to the low solubility of the reactants in the electrolyte. The formation of metallic iron during charge is slow due to the low solubility of the reaction product ferrous hydroxide. While the slow formation of iron crystals preserves the electrodes, it also limits the high rate performance. Ni—Fe cells are typically charged galvanostatically and should not be charged from a constant voltage supply since they can be damaged by thermal runaway. Thermal runaway occurs due to a drop in cell voltage as gassing begins due to overcharge, raising the cell temperature, increasing current draw from a constant potential source, further increasing the gassing rate and temperature.

As shown in Equation (1), the overall cell reaction does not involve the battery electrolyte; however, alkaline conditions are required for the individual electrode reactions. Therefore, Ni—Fe batteries all employ a strong alkaline electrolyte typically of KOH, typically in the range of 30-32 weight % KOH. KOH is preferred due to its low cost, higher conductivity, and low freezing point. LiOH may be added in cells subject to high temperatures due to its stabilization effects on the nickel electrode, improving its charge acceptance at elevated temperatures.

A known performance issue of iron electrodes is premature passivation of the iron surface. Thus, iron electrodes whose active mass consists of pure iron become passivated after a limited number of cycles. This is apparently due to the formation of iron oxides that form on the electrode surface, inhibiting the charging process.

It is known in the art that sulfur or sulfides can be added to the iron electrode active mass to inhibit the passivation of the electrode (D. Linden and T. Reddy, Editors, "Handbook of Batteries, Third Edition", McGraw-Hill, © 2002). Sulfur and/or sulfide addition changes the electrocrystallization kinetics and makes the iron electrode reaction more reversible. Sulfide also is known to absorb on the iron electrode, raising the overpotential for the hydrogen evolution reaction during charging. A disadvantage of the prior art associated with adding sulfur or sulfides to the iron active mass is loss of sulfide over time due to dissolution of sulfide into the electrolyte and resultant oxidation to sulfate, which is ineffective in providing lasting activation of the iron electrode.

The addition of sulfide additives to an alkaline electrolyte is similarly known in the art. Particularly, the addition of sulfur content is described in Swedish Pat. No 196,168 which recommends sulfide concentrations on the order of 0.03 to 0.1% by weight of the iron active mass. It has further been suggested by others that if the local sulfide concentration is too high, the activating effect is actually reversed due to blockage of the active mass. Hence, U.S. Pat. No. 4,250,236A teaches the use of sparingly soluble sulfide compounds whose solubility is at most $10^{-2}$ moles per liter. These inventors claim that higher concentrations of sulfide in the electrolyte do not result in substantial prolongation of the life time of the electrode due to oxidation of sulfide to sulfate, which may precipitate and block pores of the electrode. In fact, the patent states that concentrations in excess of $10^{-2}$ moles per liter is detrimental to battery performance and life.

One problem associated with state-of-the-art Ni—Fe batteries is the need for prolonged activation of the cell. As constructed, the iron electrode is in a near fully charged state, existing predominately of metallic iron. In contrast, as constructed the $Ni(OH)_2$ electrodes exist in a fully discharged state in the assembled cell. The as-constructed cell then is largely out of balance with respect to state of charge. Hence, multiple cycles are required to achieve appropriate cell balance by bringing both electrodes to the same state of charge. This results in an expensive manufacturing process since multiple battery cyclers are required during this lengthy activation in volume production, resulting in high capital equipment expenditures.

Another problem associated with state-of-the-art Ni—Fe batteries is the high rate of self-discharge associated with hydrogen evolution occurring at the charged iron electrode. This occurs due to the fact that the potential for hydrogen evolution is more positive than the potential for the electrode reaction during charge of $Fe(OH)_2$ to Fe. Kinetic effects allow for the charge reaction to proceed, but at low efficiencies. Because the potential for hydrogen evolution is less negative than the potential for electrode charging, this further leads to low charge efficiency.

As described in U.S. Pat. No. 4,250,236, it is necessary to maintain a given sulfide concentration in the electrolyte for long-lasting activation of the iron electrode. While this may be achieved through loading of sulfur or sulfide additives in the iron electrode active mass, dissolution of these compounds will ultimately diminish the amount of sulfide available, limiting battery life.

Problems associated with current Ni—Fe batteries have hindered their acceptance for many applications that would be well served by a robust, high energy, long life battery. The industry would be well served by an improved iron battery such as Ni—Fe, Mn—Fe or Fe-air battery. Such an improved battery would enable usage in a broader field of applications. A battery with an iron anode having improved efficiency, charge retention and cycle life would be greatly welcomed by the battery industry.

SUMMARY OF THE INVENTION

The present invention provides one with a battery employing an iron anode and a nickel cathode in contact with a ternary electrolyte comprising NaOH, LiOH, and a sulfide additive. The use of said electrolyte provides improved charge efficiency, charge retention, and cycle life. Furthermore, the use of an iron electrode in contact with the improved electrolyte allows for reduced time for activation of the cell. The iron electrode may be of a pasted design as described in U.S. Provisional Patent Application 61/759,777, filing date Feb. 1, 2013, which is incorporated herein by reference in its entirety.

Among other factors, it has been found that contrary to teachings in the prior art, moderate concentrations of sulfide in the electrolyte in the range of 0.23-0.75% by weight of electrolyte (approximately 0.23 to 0.75% of the active mass of the iron) is beneficial to the life and performance of iron electrodes when the sulfide is used in combination with a NaOH based electrolyte also containing LiOH. This is also particularly relevant when the iron electrodes are used as a negative electrode in a Ni—Fe battery.

DETAILED DESCRIPTION OF THE INVENTION

The invention comprises a battery with an iron electrode in contact with a particular electrolyte, said electrolyte being a sodium hydroxide based electrolyte with the NaOH generally having a concentration of 5-7 M in the electrolyte. Additionally, the electrolyte contains lithium hydroxide and a metal sulfide. In one embodiment, the NaOH concentration is about 6 M, the LiOH concentration is on the order of 1 M, and the metal sulfur hydrated sodium sulfide concentration in the electrolyte is about 1 wt %.

It has been found unexpectedly that the use of a sodium-based electrolyte improves charge retention compared to the conventional KOH electrolyte. The entire cell is also more stable and effective at high temperatures due to the addition of LiOH to the NAOH, which improves charge acceptance of the $Ni(OH)_2$ positive electrode, increasing cell capacity. The presence of sulfide in the electrolyte has been discovered to be important for the effective deposition of sulfur on the iron negative electrode. A cell or battery with an iron anode performs better with sulfide in the electrolyte, as the sulfide deposits on the iron anode as a performance enhancer after only a few cycles. The sulfide is believed to increase the effective surface area of the iron, so one obtains more utilization of the iron active mass, resulting in higher capacity and power. In addition, the added sulfide is believed to form iron sulfides, two of the forms being FeS and $Fe_2S_3$, both of which are more electrically conductive than $Fe(OH)_2$ which normally forms on the iron surface. These conductive sites on the iron surface create a situation in which the oxidized layer that forms on the iron surface is thicker before true electrical passivation occurs allowing for more efficient use of the underlying iron active material. Various sulfide salts may be employed to obtain this desirable result. In one embodiment, the sulfide salt is sodium sulfide.

It has also been found that the concentration of sulfide per se in the electrolyte can be important. In one embodiment, the amount of sulfide per se, i.e., in the amount of sulfide itself, as measured as a percentage of the weight of electrolyte, is from 0.23% to 0.75%. In one embodiment, the amount of sulfide per se, measured as a percentage of the iron in the electrode, ranges from 0.23 wt % to 0.75 wt %.

The metal sulfide is preferably $Na_2S$. The sodium sulfide can be, for example, hydrated $Na_2S$. Hydrated sodium sulfide is about 60% $Na_2S$ by weight, and this must be considered in calculating the amount of sulfide per se used in the electrolyte. In general, the amount of $Na_2S$ used in the electrolyte ranges from 1-2 wt %, based on the weight of the electrolyte.

In one embodiment, the concentration of the NaOH in the electrolyte is in the range of from 6 to 7.5M. In one embodiment, the amount of LiOH in the electrolyte is in the range of from 0.5 to 2.0M, and most preferably about 1.0M.

The combination of NaOH with LiOH and a sulfide is unique in its effective result. Using the ternary electrolyte in the amount discussed above provides improved charge efficiency, charge retention and cycle life.

It has also been discovered that using the preferred electrolyte described above in combination with an iron electrode coated onto a single substrate significantly reduces the time required for activation of the cell or battery. In particular, use of this electrolyte in conjunction with an adhering type of iron electrode comprising of iron active materials pasted onto a conductive substrate such as a metal foil or foam, results in a battery with improved performance over Ni—Fe batteries of conventional pocket plate design. Performance is further improved if such an adhering type of iron electrode contains sulfur or sulfide additives.

While the use of metal sulfides such as sodium sulfide is described above, it will be understood that other sulfide compounds of suitable solubility may also be used. Examples of such sulfides include inorganic sulfides with sufficient solubility, but also organic sulfur compounds known to decompose in the electrolyte to inorganic sulfide.

The battery can be made using conventional means and processes. However, the anode must be an iron anode. In one embodiment, the iron anode itself is different from the traditional pocket anode design. The anode is a single, coated conductive substrate, which can be coated on one side, or both sides. The anode can also be made by a simple coating process, which can be continuous.

The single substrate of the iron anode is used as a current conducting and collecting material that houses the active material (iron) of the electrode. In the traditional pocket design, the substrate encompasses the active material and holds the material. Two layers of substrate are therefore required per electrode. In the single substrate design, a single layer of substrate is used. This single layer acts as a carrier with coated material bonded to at least one side. In one embodiment, both sides of the substrate are coated. This substrate may be a thin conductive material such as a metal foil or sheet, metal foam, metal mesh, woven metal, or expanded metal. For example, a 0.060 inch, 80 ppi, nickel foam material has been used. In one embodiment, the conductive substrate is a nickel foam, nickel felt or a nickel foil.

In one embodiment, the foil is a perforated foil in which the perforation results in burrs that protrude above and below the surface of the foil. In another embodiment the conductive metal foil substrate has metallic nickel or iron particles sintered onto the surface of the foil.

In one embodiment, the iron electrode is affixed to a two-dimensional or flat conductive substrate, for example, which comprises a perforated strip or expanded metal.

The coating mix for the iron anode is a combination of binder and active materials in an aqueous or organic solution. The mix can also contain other additives such as pore formers. Pore formers are often used to insure sufficient $H_2$ movement in the electrode. Without sufficient $H_2$ diffusion, the capacity of the battery will be adversely affected. The binder materials have properties that provide adhesion and bonding between the active material particles, both to themselves and to the substrate current carrier. The binder is generally resistant to degradation due to aging, temperature, and caustic environment. The binder can comprise polymers, alcohols, rubbers, and other materials, such as an advanced latex formulation that has been proven effective. A polyvinyl alcohol binder is used in one embodiment.

The active material for the mix formulation of the iron anode is selected from iron species that are generally less oxidative. Such materials include metal Fe and iron oxide materials. The iron oxide material will convert to iron metal when a charge is applied. A suitable iron oxide material includes $Fe_3O_4$. In addition, any other additives are generally required to be of a less oxidative nature, such as sulfur, antimony, selenium, and tellurium.

The coating method can be a continuous process that applies the active material mixture to the substrate by a method such as spraying, dip and wipe, extrusion, low pressure coating die, or surface transfer. A batch process can also be used, but a continuous process is advantageous regarding cost and processing. The coating mixture has to maintain a high consistency for weight and thickness and coating uniformity. This method is conducive to layering of various materials and providing layers of different properties such as porosities, densities and thicknesses. For example, the substrate can be coated with three layers. The first layer being of high density, second layer of medium density, and final layer of a lower density to create a density gradient which improves the flow of gases from the active material to the electrolyte, and provides better electrolyte contact and ionic diffusion with the active material throughout the structure of the electrode.

After coating, the electrode is dried to remove any residual liquid, i.e., aqueous or organic solvent. The drying methods will generally provide a continuous method for liquid removal from the coated active material which will enhance the adhesion and binding effects of the dry constituents without iron ignition. This drying method provides a uniform and stable active material coating with the substrate material. Two stages of drying can be used. For example, the first can be radiation for bulk drying, for cost and quality control, followed by convection drying to remove the remaining liquid. The radiation used can be any radiation, such as infrared, microwave or UV, and is very fast. However, the radiation creates a high temperature at the surface of the coated electrode. The high temperature is fine as long as water is still present to act as a heat sink. Therefore, the water is generally removed to about 10-20 wt % water. This can generally be determined using a control chart. Going below 10% water is dangerous, as the electrode becomes too dry and the high temperature can ignite the iron. Thus, using the convention drying to complete the removal of water/liquid is a preferred embodiment, once the amount of water remaining is in the 10-20 wt % range. In another embodiment, radiation can be used to complete the drying if the process is conducted in an inert atmosphere.

The compaction methods used can be accomplished by rolling mill, vertical pressing, and magnetic compaction of the active material to the desired thickness from 0.005 to 0.500 inches and porosities from 10% to 50%, for high quality and low cost continuous processing. In one embodiment, the porosity of the electrode is from 15-25% porosity. This compaction method can be used in conjunction with the layering method described above for providing material properties of density, thickness, porosity, and mechanical adhesion.

In addition, continuous in-line surface treatments can be applied continuously throughout any of the steps including coating, layering, and drying processes. The treatments can apply sulfur, polymer, metal spray, surface lament, etc.

The present batteries including the iron electrode can be used, for example, in a cellphone, thereby requiring an electrode with only a single side coated. However, both sides are preferably coated allowing the battery to be used in numerous additional applications.

The invention will be illustrated more fully in the following illustrative examples. The examples are meant to be illustrative, and not limiting.

EXAMPLE 1

A matrix of electrolytes was constructed for evaluation in Ni—Fe cells. Alkali hydroxides for consideration included KOH, NaOH, CaOH, SrOH, and BaOH. Solubility limitations of certain salts limited the test to KOH and NaOH. Particularly, a series of cells with varying concentrations of NaOH was constructed. NaOH concentration ranged from 6.0 M to 7.5 M. All electrolytes contained 1 M LiOH. Cells were constructed from iron anodes that were prepared by pasting a mix comprising 98% Fe powder and 2% PVA into a Ni foam substrate, drying, and followed by compression. The $Ni(OH)_2$ electrodes were prepared in accordance with standard art for alkaline batteries. Cells were constructed by placing 3 Fe electrodes coupled with 2 $Ni(OH)_2$ electrodes, each positive electrode encapsulated in battery separator and filled with the appropriate electrolyte. Cells were cycled and the utilization of the iron active mass determined on a mA/h g Fe basis. No significant difference was observed over the range of 6.0 molar to 7.5 molar. Electrolyte levels below 6.0 M were deemed inappropriate due to unacceptable high freezing point and low conductivity. Levels above 7.5 M were similarly deemed inappropriate due to concerns over water loss during overcharge, resulting in unacceptably high concentrations of base.

Based on these studies, it was determined that NaOH with 1 M LiOH is the preferred base for the ternary electrolyte of the invention. The preferred range of NaOH concentration is between 6.0 M and 7.5 M. In one embodiment, 6.0 M is the preferred concentration of NaOH.

EXAMPLE 2

A series of electrolytes for test were prepared using 6.0 M NaOH with 1 M LiOH. Different levels of $Na_2S$ were then added to the binary electrolyte. A series of Ni—Fe test cells were assembled as follows: 3 iron anodes were coupled with 2 $Ni(OH)_2$ electrodes in a prismatic cell case. Iron anodes were prepared by mixing iron powder and PVA binder into a paste which was applied to a Ni foam substrate, dried, and compressed. Positive $Ni(OH)_2$ electrodes of standard sintered construction were used. Each cell was then filled with electrolyte containing varying levels of $Na_2S$ additive, in the range of 1% to 3% by weight $Na_2S$.

The cells were then cycled, and the iron active mass utilization measured at cycle 1 and cycle 6 for each cell. The results are summarized in the following table:

| Cell Number | % Na$_2$S | Cycle 1 mA h/g Fe | Cycle 6 mA h/g Fe |
|---|---|---|---|
| 1472 | 0% | 5 | 5 |
| 1473 | 0% | 5 | 5 |
| 1474 | 1% | 115 | 130 |
| 1475 | 1% | 115 | n/a |
| 1476 | 2% | 105 | 115 |
| 1477 | 2% | 120 | 125 |
| 1478 | 3% | 75 | 115 |
| 1479 | 3% | 65 | 110 |

From the above table, it is clear that the addition of Na$_2$S has a significant impact on the activation of the iron electrode, particularly in the range of 1% to 2% by weight of electrolyte. The amount corresponds to concentrations of sulfide in the electrolyte in the range of from 0.23-0.75% by weight of electrolyte, as well as 0.23-0.75% by weight of the active mass of iron in the iron anode. Higher levels of Na$_2$S appear to have an adverse effect, perhaps due to blockage of the pores in the iron electrode.

EXAMPLE 3

A series of cells were prepared to evaluate the effect of KOH, NaOH, and LiOH at different concentrations with 1% Na$_2$S. The pasted negative electrode consisted of 97.91% iron powder, 0.80% of CMC (carboxymethylcellulose), 0.29% PVA, and 1.00% PTFE on a Ni foam substrate. The positive electrode was a sintered nickel electrode impregnated with nickel hydroxide and a 5 mil thick polyolefin nonwoven mesh was used as the separator. The electrolytes detailed in the table below all had Na$_2$S present at a concentration of 1 weight %.

After formation, cell performance was evaluated as a function of discharge rate. Cell performance is shown in the following table:

| Discharge Rate | Ah capacity 20% KOH with 50 g/L LiOH | Ah capacity 6M NaOH with 1M LiOH | Ah capacity 4M NaOH with 2M LiOH |
|---|---|---|---|
| C/10 | 1.34 | 1.40 | 1.34 |
| C/5 | 1.04 | 1.16 | 1.08 |
| C/2 | 0.80 | 0.95 | 0.92 |
| C | 0.66 | 0.81 | 0.80 |
| 2 C | 0.45 | 0.54 | 0.56 |

From the table it can be seen that particularly at higher rates, Ni—Fe cells employing NaOH in place of KOH showed improved performance.

EXAMPLE 4

A series of laboratory Ni—Fe cells was constructed employing two different electrolytes for the purpose of evaluating self-discharge. One group of cells employed 6.8 M NaOH and the second group of cells employed 6 M KOH. Self-discharge data are shown in the following table:

| Test Conditions | % charge retention NaOH | % charge retention KOH |
|---|---|---|
| 28 days room temp | 88% | 30% |
| 28 days 40 C. | 73% | 19% |
| 28 days 60 C. | 13% | n/a |

From the table, it can be seen that the use of NaOH in place of KOH significantly improved self-discharge performance of the cells.

EXAMPLE 5

A series of laboratory Ni—Fe cells were constructed to evaluate the effect of an alternative sulfur additive, thiourea. Cells were constructed from 3 Fe electrodes in combination with two sintered positive plates, having a rated capacity of 0.8 Ah. One group of cells was filled with electrolyte consisting of KOH/LiOH with 0.02 w % thiourea and a second set was filled with KOH/LiOH and 0.10 w % thiourea.

The cells employing 0.02% thiourea delivered 0.6 Ah at C/10 discharge, but showed no capacity at C/rate. Cells with the higher level of thiourea also gave good capacity at C/10, and yielded about 0.16 Ah at C rate. However, this performance was poor relative to using Na$_2$S as an electrolyte additive.

EXAMPLE 6

A series of commercially available Ni—Fe cells with a rated capacity of 10 Ah per the supplier was filled with a series of different electrolytes and the initial performance evaluated. Results are summarized in the following table:

| Electrolyte | Capacity (Ah) | Mid-point voltage (V) |
|---|---|---|
| 9N NaOH | 17 Ah | 1.19 V |
| 7.5N NaOH | 19.3 Ah | 1.21 V |
| 6.0N NaOH | 18.3 Ah | 1.23 V |
| 4.5N LiOH | 16.3 Ah | 1.22 V |

From this data, it can be seen that the preferred concentration for NaOH is in the range of 6.0 M to 7.5 M.

EXAMPLE 7

A series of laboratory Ni—Fe cells were constructed employing pasted Fe electrodes containing 1% by weight Na$_2$S in the active material paste and having a rated capacity of 1.2 Ah. These cells were then filled with two different samples of electrolyte. The first cell was filled with an electrolyte comprised of KOH and LiOH. The second cell was filled with the same KOH, LiOH electrolyte but also containing 1 w % Na$_2$S. Cell performance was evaluated as a function of discharge rate and the data are summarized below:

| Discharge rate | KOH/LiOH Ah capacity | KOH/LiOH + Na$_2$S Ah capacity |
|---|---|---|
| C/10 | 1.20 | 1.26 |
| C | 0.06 | 0.75 |
| 2 C | 0.04 | 0.55 |
| 4 C | 0 | 0.25 |

From this data it is readily seen that the addition of Na$_2$S significantly improves the high rate performance of the Ni—Fe cells even when used in conjunction with iron electrodes containing Na$_2$S in the active mass.

EXAMPLE 8

A series of laboratory Ni—Fe cells were constructed employing pasted Fe electrodes in combination with sintered positive electrodes and having a rated capacity of 1.6 Ah. Cells were filled with three variations of electrolyte. All cells employed a base electrolyte of 6 M NaOH, 1 M LiOH. One group of cells did not contain any additive, while two groups of cells contained 1 w % and 2 w % $Na_2S$ respectively. Cell capacity as a function of discharge rate was evaluated and the results are summarized in the following table:

| Discharge rate | 0% $Na_2S$ Ah capacity | 1% $Na_2S$ Discharge capacity | 2% $Na_2S$ Discharge capacity |
| --- | --- | --- | --- |
| C/10 | 0.45 | 1.40 | 1.42 |
| C/5 | 0.04 | 1.07 | 1.27 |
| C/2 | N/A | 0.90 | 1.07 |
| C | N/A | 0.40 | 0.69 |
| 2 C | N/A | 0.14 | 0.35 |
| 5 C | N/A | 0.02 | 0.04 |

The data shows that the addition of $Na_2S$ significantly improves the performance of Ni—Fe cells, particularly at high discharge rates.

EXAMPLE 9

A series of laboratory Ni—Fe cells were constructed from pasted Fe electrodes in combination with sintered positive electrodes and having a rated capacity of 1.1 Ah. Three different electrolytes were employed to evaluate the effect of concentration of NaOH on cell performance, particularly as a function of discharge rate. The results are summarized in the following table:

| Discharge rate | 6.0M NaOH, 1M LiOH, 1 w % $Na_2S$ | 6.8M NaOH, 1M LiOH, 1 w % $Na_2S$ | 7.5M NaOH, 1M LiOH, 1 w % $Na_2S$ |
| --- | --- | --- | --- |
| C/10 | 0.87 | 0.84 | 0.82 |
| C/5 | 0.74 | 0.76 | 0.70 |
| C/2 | 0.49 | 0.50 | 0.45 |
| C | .032 | 0.32 | 0.25 |
| 2 C | 0.14 | 0.16 | 0.12 |
| C/10 Cycle 50 | 0.86 | 0.81 | 0.65 |

It can be seen from the data that varying the concentration of NaOH from 6.0 M to 7.5 M had little to no impact on initial performance at various rates. However, the use of higher concentration NaOH showed a negative impact on cycle life.

EXAMPLE 10

A series of laboratory Ni—Fe cells with a nominal capacity of 1.6 Ah were constructed from pasted Fe electrodes in combination with sintered positive electrodes and having a rated capacity of 1.1 Ah. The iron electrodes consisted of 80.5% Fe powder, 16% nickel powder, and 3.5% PVA pasted onto nickel plated steel. Three different electrolytes were tested to evaluate the effect of LiOH and $Na_2S$ in a NaOH electrolyte. The NaOH concentration was 6M and in the tests where they were used, the concentration of LiOH was 1 M and the concentration of monohydrated $Na_2S$ was 1%. The results are summarized in the following table.

| Electrolyte | Iron utilization (mAh/g Fe) at various discharge rates | | | |
| --- | --- | --- | --- | --- |
| | C/10 | C/4 | 1 C | 2 C |
| NaOH/LiOH/$Na_2S$ | 72 | 47.2 | 13.4 | 3.5 |
| NaOH/LiOH | 1.1 | 0.8 | 0.4 | 0.2 |
| NaOH | 1.0 | 0.7 | 0.3 | 0.2 |

It can be seen from the data that the iron electrodes have very poor performance without sulfide present in the electrolyte.

While the foregoing written description of the invention enables one of ordinary skill to make and use what is considered presently to be the best mode thereof, those of ordinary skill will understand and appreciate the existence of variations, combinations, and equivalents of the specific embodiment, method and examples herein. The invention should therefore not be limited by the above described embodiment, method, and examples, but by all embodiments and methods within the scope and spirit of the invention.

What is claimed is:

1. A battery comprising an iron anode, a nickel cathode, and an electrolyte comprised of sodium hydroxide, lithium hydroxide and a soluble metal sulfide, wherein the amount of sulfide contained in the electrolyte ranges from 0.23% to 0.75% by weight of the electrolyte, the amount of lithium hydroxide in the electrolyte is in the range of from 0.5 to 2.0 M, and with the iron anode comprising a polyvinyl alcohol binder.

2. The battery of claim 1, wherein the metal sulfide is an alkali metal sulfide.

3. The battery of claim 2, wherein the metal sulfide is sodium sulfide.

4. The battery of claim 1, wherein the iron anode contains sulfur or sulfur compounds.

5. The battery of claim 1, wherein the concentration of sodium hydroxide in the electrolyte is in the range of from 6.0 M to 7.5 M.

6. The battery of claim 1, wherein the amount of metal sulfide in the electrolyte is in the range of from 1-2% by weight.

7. The battery of claim 1, wherein the concentration of sodium hydroxide in the electrolyte ranges from 6.0 M to 7.5 M, and the amount of metal sulfide present in the electrolyte ranges from 1-2% by weight.

8. The battery of claim 7, wherein the concentration of sodium hydroxide in the electrolyte ranges from 6.0 M to 7.0 M, and the amount of metal sulfide present in the electrolyte ranges from 0.5 to 1.5 wt %.

9. The battery of claim 8, wherein the concentration of sodium hydroxide in the electrolyte is about 6.0 M, and the amount of metal sulfide in the electrolyte is about 1% by weight.

10. The battery of claim 1, wherein the iron electrode is affixed to a two dimensional conductive substrate.

11. The battery of claim 10, wherein the conductive substrate is a perforated strip or expanded metal.

12. The battery of claim 1, wherein the iron electrode comprises a three dimensional conductive substrate.

13. The battery of claim 12, wherein the conductive substrate is a metal foam, metal felt, or metal foil.

14. The battery of claim 13, wherein the foil is a perforated foil in which the perforation result in burrs that protrude above and below the surface of the foil.

15. The battery of claim 13, wherein the foil has metallic nickel or iron particles sintered onto the surface of the foil.

\* \* \* \* \*